(12) United States Patent
Sherman et al.

(10) Patent No.: US 9,183,723 B2
(45) Date of Patent: Nov. 10, 2015

(54) FILTER CLOG DETECTION AND NOTIFICATION SYSTEM

(71) Applicant: CleanAlert, LLC, Oberlin, OH (US)

(72) Inventors: William Sherman, West Chester, PA (US); Richard Green, Hatboro, PA (US)

(73) Assignee: CLEANALERT, LLC, Oberlin, OH (US)

( * ) Notice: Subject to any disclaimer, the term of this patent is extended or adjusted under 35 U.S.C. 154(b) by 0 days.

(21) Appl. No.: 14/296,872

(22) Filed: Jun. 5, 2014

(65) Prior Publication Data

US 2015/0254958 A1    Sep. 10, 2015

Related U.S. Application Data

(63) Continuation-in-part of application No. 13/363,361, filed on Jan. 31, 2012.

(51) Int. Cl.
| | |
|---|---|
| G01F 7/00 | (2006.01) |
| G01B 21/18 | (2006.01) |
| G08B 21/18 | (2006.01) |
| B01D 46/00 | (2006.01) |
| F24F 11/00 | (2006.01) |

(52) U.S. Cl.
CPC ............ G08B 21/18 (2013.01); B01D 46/0086 (2013.01); F24F 2011/0093 (2013.01)

(58) Field of Classification Search
CPC ..................... B01D 46/0086; F24F 2011/0093; G08B 21/18
USPC .......................................................... 702/45
See application file for complete search history.

(56) References Cited

U.S. PATENT DOCUMENTS

| | | |
|---|---|---|
| 4,050,291 A | 9/1977 | Nelson |
| 4,751,501 A | 6/1988 | Gut |
| 5,461,368 A | 10/1995 | Comer |
| 5,668,535 A | 9/1997 | Hendrix et al. |
| 5,774,056 A | 6/1998 | Berry, III et al. |
| 6,040,777 A | 3/2000 | Ammann et al. |
| 6,448,896 B1 | 9/2002 | Bankus et al. |
| 6,670,810 B2 | 12/2003 | Duncan et al. |
| 6,703,937 B1 | 3/2004 | Franz et al. |
| 6,842,117 B2 | 1/2005 | Keown |
| 6,993,414 B2 | 1/2006 | Shah |
| 6,994,620 B2 | 2/2006 | Mills |
| 7,048,775 B2 | 5/2006 | Jornitz et al. |
| 7,095,321 B2 | 8/2006 | Primm et al. |
| 7,178,410 B2 | 2/2007 | Fraden et al. |
| 7,244,294 B2 | 7/2007 | Kates |

(Continued)

OTHER PUBLICATIONS

Rich Harlans, HVAC Forced Air Filter Monitoring System, Feb. 12, 2010, http://www.youtube.com/watch?v=G9jcGfn5uLw (see description by person who uploaded the video on YouTube, attached).

(Continued)

*Primary Examiner* — Janet Suglo

(74) *Attorney, Agent, or Firm* — Wyatt, Tarrant & Combs, LLP; Stephen C. Hall

(57) ABSTRACT

A gas filter clogging detection system for monitoring filter performance and condition based on indicators of the accumulation of dirt and other particles on a filter positioned in a gas conduit, in which a notification system provides alerts and reports when the amount of clogging reaches a pre-determined threshold.

19 Claims, 13 Drawing Sheets

(56) References Cited

U.S. PATENT DOCUMENTS

| | | |
|---|---|---|
| 7,281,409 B2 | 10/2007 | Baumfalk et al. |
| 7,336,168 B2 | 2/2008 | Kates |
| 7,360,400 B2 | 4/2008 | Baumfalk et al. |
| 7,456,736 B2 | 11/2008 | Primm et al. |
| 7,479,876 B2 | 1/2009 | Carle et al. |
| 7,490,512 B2 | 2/2009 | Fraden |
| 7,640,077 B2 | 12/2009 | Shah |
| 7,647,202 B2 | 1/2010 | Lamontagne |
| 7,726,186 B2 | 6/2010 | Nair |
| 7,889,074 B2 | 2/2011 | Anderson |
| 8,007,568 B2 | 8/2011 | DiLeo et al. |
| 8,034,170 B2 | 10/2011 | Kates |
| 8,090,477 B1 * | 1/2012 | Steinberg ..................... 700/278 |
| 8,298,322 B2 | 10/2012 | Grzonka et al. |
| 8,298,323 B2 | 10/2012 | Grzonka et al. |
| 8,428,856 B2 | 4/2013 | Tischer |
| 8,542,115 B2 | 9/2013 | Karim et al. |
| 2003/0097875 A1 | 5/2003 | Lentz et al. |
| 2004/0263351 A1 | 12/2004 | Joy et al. |
| 2006/0144232 A1 | 7/2006 | Kang et al. |
| 2007/0277592 A1 | 12/2007 | Johansson et al. |
| 2009/0109020 A1 | 4/2009 | Tischer |
| 2009/0165644 A1 * | 7/2009 | Campbell ..................... 95/25 |
| 2010/0017151 A1 | 1/2010 | Kerrigan et al. |
| 2010/0099193 A1 | 4/2010 | Hsu et al. |
| 2010/0313748 A1 | 12/2010 | Schluter |
| 2011/0215923 A1 | 9/2011 | Karim et al. |
| 2012/0260804 A1 | 10/2012 | Kates |

OTHER PUBLICATIONS

William Sherman, "Filterscan® WiFi Air Filter Monitor & Notification System," brochure, 2014 AHR (A/C, Heating and Refrigeration) Expo, Jan. 21, 2014, New York.

"WiFi Filterscan® Air Filter Monitor from CleanAlert Takes the Guesswork out of HVAC System Filter Maintenance," press release of CleanAlert, LLC (Applicant), 2014 AHR (A/C, Heating and Refrigeration) Expo, Jan. 21, 2014, New York.

The United Patent and Trademark Office; The International Search Report and the Written Opinion of the International Searching Authority, or the Declaration of PCT/US15/32220; Search report and Written opinion; Aug. 12, 2015; pp. 1-14; The United Patent and Trademark Office as Searching Authority; U.S.A.

* cited by examiner

| EDIT PROFILE | EDIT PAYMENT INFORMATION |
|---|---|
| EDIT MONITOR INFORMATION | ADD MONITOR |
| EDIT MESSAGES | RESET ALARM |
| REQUEST FILTER STATUS | GO TO CLEANALERT.COM |

FILTER CLOG DETECTION AND NOTIFICATION SYSTEM

CROSS REFERENCE TO RELATED APPLICATIONS

This is a continuation-in-part application of, with portions of this application claiming priority to, U.S. nonprovisional patent application Ser. No. 13/363,361, filed on Jan. 31, 2012, the teachings and entire disclosure of which are fully incorporated herein by reference.

BACKGROUND

Embodiments described and claimed herein relate to monitoring and detection of clogging in a gas filter, which is utilized in a gas conduit attached to a gas blower, the latter having a motor for producing a first gas flow. Herein, gas flow refers to the movement of gas, which can be air confined to a space, and gas filter refers to a filter positioned in such a way that gas flows through it. Commonly known applications for gas filtration include, but are not limited to, filter monitoring for Heating, Ventilation, and Air Conditioning (HVAC) systems. Such systems are used for a variety of functions, from simple ventilation to heating, cooling, and humidity control.

Generally, the purpose of a HVAC system is to move air for temperature and environmental comfort within a house, building, or factory (collectively referred to herein as building). The same purpose applies to automobiles and other structures in which healthy, comfortable air/gas quality is necessary or desired. In a HVAC system, a blower, having a motor for producing a first gas flow, moves air in the gaseous phase through one or more gas conduits (ducts) to different locations within a building before it exits the duct through a vent. After entering a duct through a HVAC system's air intake, air flows in response to a blower. Typical blowers have a motor that rotates a fan having a plurality of blades, in order to pull air through a duct in a direction that can be thought of as moving from upstream to downstream.

Many HVAC systems use filters to remove dust, dirt, contaminants, and other undesired particles that adversely affect air quality so they are not delivered past a certain location within the duct, and do not exit through a vent. Filters limit the progress of undesired particles through a duct, for example by physical restriction in which the small size of openings in a filter keeps particles from progressing through and past it, or by electrostatic attraction that hold particles to a filter.

As a filter collects undesired particles, it becomes discolored and dirty. Although a dirty filter does not substantially affect flow of air through a duct, over time, the accumulation of undesired particles produces clogging in a filter, which substantially decreases air flow in the building, and causes dust and dirt to accumulate inside the duct system and on the blower fan blades, all of which potentially reduces the quality of air in a building and adversely affects the performance of the HVAC system. Consequently, filters in systems such as HVAC systems, as well as automobiles, must be changed periodically.

Visual inspection is one way to determine when a filter should be changed, but it is time- and labor-intensive. Therefore, it is desirable in many situations to automatically sense whether a filter should be changed. This is often done by evaluating the condition of a filter as a function of measurable conditions that are related to air flowing through a duct. For example, one such air treatment system is described in U.S. Pat. No. 7,178,410, titled Clogging Detector for Air Filter, the entire disclosure of which is incorporated herein by reference.

This patent discloses a filter clog detector, in which a first temperature sensor, which is coupled to a heater, and a second temperature sensor, which is unheated, are positioned in a duct. The heated sensor is kept at a temperature higher than the unheated sensor by a fixed number of degrees. If air flow velocity is greater, then more energy is dissipated away from the heated sensor. Accordingly, a measurement of the voltage required to maintain the temperature difference between the two sensors indicates the amount of air flowing through the duct where the sensors are located. Using techniques that are known to persons of ordinary skill in the art, including but not limited to those disclosed in the above-referenced patent, filter condition can be determined based on voltage readings, or similar properties having a relationship to air flow through a duct.

Other examples, regarding how filter condition is determined as a function of measurable properties or conditions within a duct, include differential pressure sensors, which respond to a pressure drop that occurs from the upstream side of a filter compared to the downstream side. Even if only to a slight degree, a new, or clean, filter restricts air flow through a duct. This restriction produces a corresponding pressure on the upstream side of the filter. Further, air passing through the filter also produces pressure on the downstream side. These pressures are measured using sensors and methods that are known to those having ordinary skill in the art. For a clean conventional filter, the differential pressure from the upstream side of the filter to the downstream side will usually be relatively small. However, as a filter becomes dirty and then clogged, the restriction on air that passes through the filter tends to decrease pressure on the upstream side. Further, because less air passes through a clogged filter, this tends to correspond to an increase in pressure on the downstream side.

Although various techniques have been disclosed for determining filter condition, as a function of measurable conditions within or related to a duct, other variables besides the extent of filter clogging may affect air flow in a duct, as indicated by measurable properties such as the voltage sensor as discussed above. For example, changes in blower speed may either increase or decrease the amount of air pulled into and through a duct. Multi-speed blowers differ from single-speed blowers and two-speed blowers, the latter of which use a two-speed motor, e.g., one speed for summer cooling and another speed for winter heating. Multi-speed blowers are capable of operating at any of a number of different speed settings. Many blowers require a period of time to stabilize and reach a consistent operating speed. For example, some blowers require approximately 60 seconds for this to occur.

Consequently, when determining when a filter should be changed, it is desirable to ascertain that readings of measurable conditions in a duct are actually indicative of a change in filter condition over time. In other words, it is desirable to prevent there from being an indication of clogging merely because of changes in blower speed.

SUMMARY

Multiple embodiments and alternatives disclosed herein relate to a sensing system for monitoring a gas filter's condition. Applications include various kinds of air handling systems. One purpose of the multiple embodiments and alternatives is for determining when a gas filter should be changed based upon its level of clogging, where such filter is used with a HVAC system or other type of gas conduit attached to a gas blower, having a motor for producing a first gas flow. The embodiments and alternatives disclosed herein compensate for and generally help to avoid the potentially compromising effects on accuracy and efficiency due to changes in blower speed, which have the potential to either mimic a clogged filter, or hide the effects of a clogged filter.

In general, these purposes are accomplished by comparing measurements at a prior time of calibration to measurements at a later time of monitoring, so that usable readings are kept and others are discarded. Throughout the descriptions and teachings herein, a reading pertains to a property that is measured. In this sense, the words measurement (or measure) and reading (or read) are used interchangeably herein. Measurements taken during monitoring events are compared to earlier measurements to determine if a blower's speed has changed. If so, the sensing system recalculates a clog threshold in response to the change. Embodiments and alternatives as disclosed herein do not require a second sensor for sensing air flow or blower fan speed.

BRIEF DESCRIPTION OF THE DRAWINGS

FIG. 9 shows a portion of a registration module used in setting up communication between a sensing system and a notification system for sending of messages and reports, according to multiple embodiments and alternatives.

FIG. 10 shows a portion of a registration module used in setting up communication between a sensing system and a notification system for sending messages and reports, according to multiple embodiments and alternatives.

FIG. 12 provides an example notification report, according to multiple embodiments and alternatives.

MULTIPLE EMBODIMENTS AND ALTERNATIVES

Figure 1:
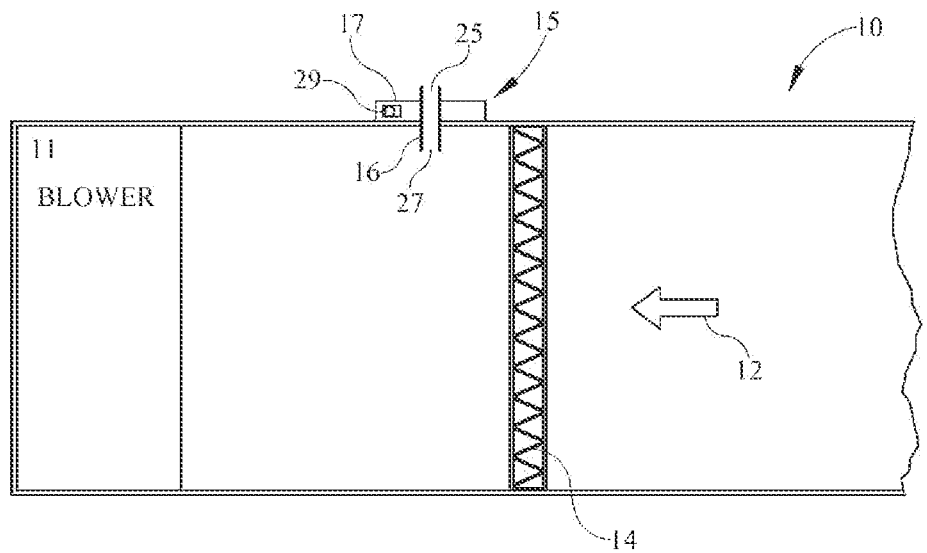
FIG. 1 illustrates a portion of a conventional HVAC system in which clogging of a gas filter is monitored, according to multiple embodiments and alternatives.

FIG. 1 is a simple diagram showing a portion of a gas conduit 10 having blower 11 that pulls air in a direction indicated by arrow 12. Gas filter 14 is positioned within duct 10. Sensing system 15 generally consists of sensing tube 16 and support base 17. In some embodiments, sensing tube 16 has an inlet 25 that ambient air from outside duct 10 flows into, and an outlet 27 providing fluid communication with the interior of duct 10. Generally, therefore, sensing tube 16 may be positioned at least partially within, or flush with, duct 10. In some embodiments, it comprises a cylindrical tube with openings at both ends (inlet 25 and outlet 27, respectively), which enable blower 11 to pull ambient air into duct 10.

In FIG. 1, sensing system 15 is incorporated with a duct at a position downstream relative to filter 14. Consequently, air entering duct 10 passes through filter 14 before it flows past the position of sensing tube 16 in the interior of duct 10. Alternatively, in some embodiments, sensing system 15 is incorporated with the duct at a position upstream relative to filter 14, meaning that air entering duct 10 will flow past sensing tube 16 before progressing through and past filter 14.

In some embodiments, sensing system 15 is attached to duct 10 by forming a hole in the wall of the duct appropriately sized to accommodate sensing tube 16. Support base 17 is also mounted to the external wall with mounting screws so as to maintain operable contact with sensing tube 16, including its various hardware and software components as described herein.

Figure 2:
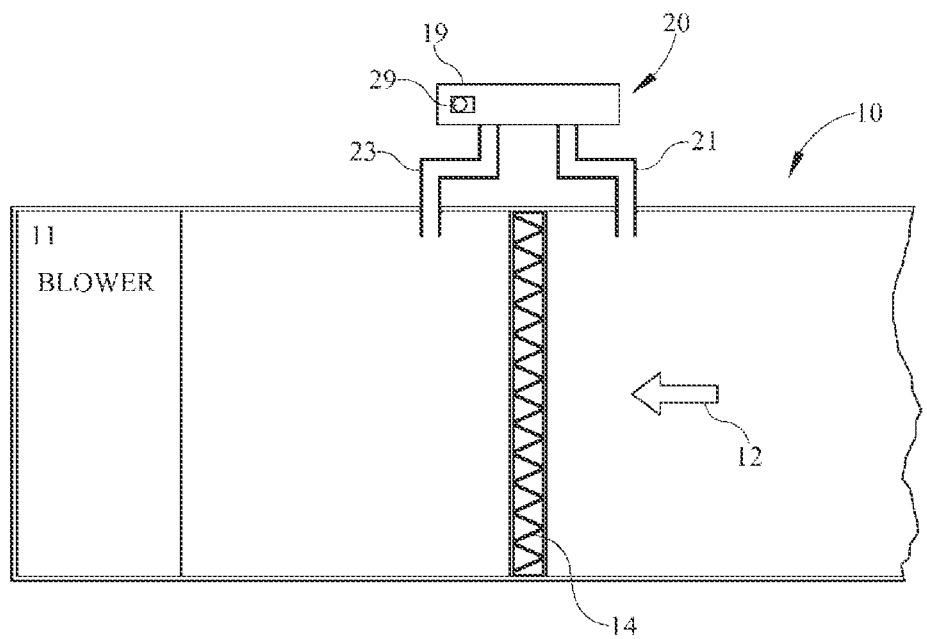
FIG. 2 illustrates a portion of a conventional HVAC system, in which clogging of a gas filter is monitored, according to multiple embodiments and alternatives.

FIG. 2 illustrates an alternative means for sensing the condition of a filter, which involves taking a pressure differential across filter 14. Accordingly, differential pressure sensor 20 comprises a differential pressure sensor support base 19, first tube 21 positioned upstream relative to filter 14, and second tube 23 positioned downstream. In some embodiments, tube 21 has the same components arranged as those of sensing tube 16. Tube 21 and tube 23 thus are arranged to measure differential pressure across filter 14, using techniques as are known to persons of ordinary skill in the art.

As illustrated in both FIG. 1 and FIG. 2, embodiments disclosed herein also include a processor 29, which acts as a controller, and which can be physically integrated with support base 17 or differential pressure sensor support base 19, respectively. In some embodiments, processor 29 includes one or more general or special purpose microprocessors, or any one or more processors of any kind of digital computer, including ones that sense conditions, and perform various calculations as further discussed herein. Processor 29 further includes, or is communicatively coupled to, computer readable storage medium such as, for example memory, which may optionally include read-only memory (ROM), random access memory (RAM), non-volatile RAM (NVRAM), optical media, magnetic media, semiconductor memory devices, flash memory devices, mass data storage device (e.g., a hard drive, CD-ROM and/or DVD units) and/or other storage as is known in the art. Additionally, processor 29 includes, or is communicatively coupled to, memory having computer readable and executable program instructions, rules, and/or routines (any set of which may be referred to herein generally as "Instructions") which, when executed by processor 29, cause it to perform the steps as described herein. In some embodiments, processor 29 is coupled to complementary components, for example user interface screens, key pads, light indicators, and/or dip switches (these are not shown) responsive to operator input to allow user control of the sensing system. Preferably, components such as screens, key pads, and light indicators are integral with support base 17 or 19, respectively. Some embodiments utilize a dip switch configured for setting the sensing system to upstream mode or downstream mode, and/or switching between such modes depending on where a person chooses to install sensing system 15 in relation to filter 14 (see FIG. 1).

Figure 3:
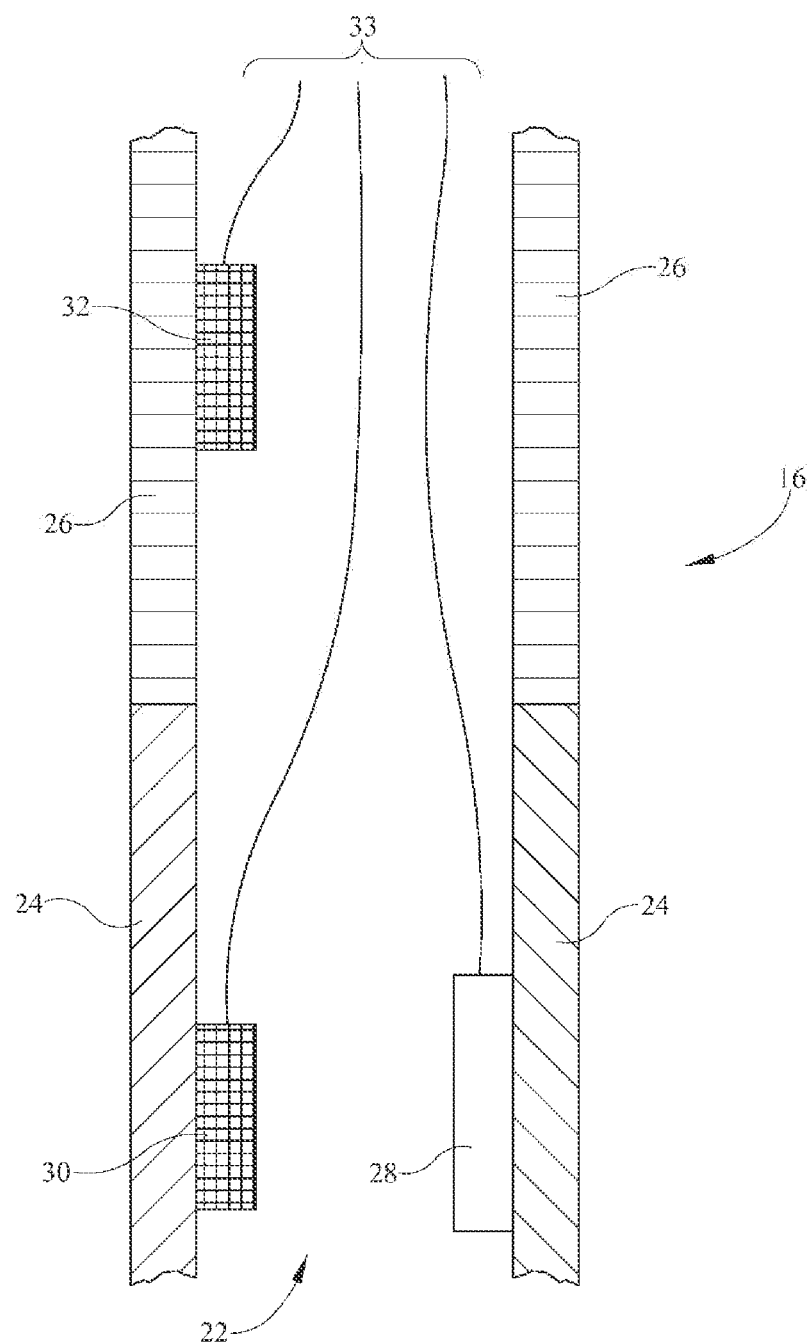
FIG. 3 is a cross-sectional view of a sensing tube as illustrated in FIG. 1, according to multiple embodiments and alternatives.

As FIG. 3 illustrates, in some embodiments, sensing tube 16 further includes an outer plate 24, preferably formed of an insulator, for separating an interior space 22 of sensing tube 16 from the interior of duct 10. In some embodiments, heater 28 is electrically coupled to heated sensor 30, both of which, along with unheated sensor 32, are positioned in the interior 22. Sensors 30, 32 and heater 28 are connected via wires 33 to an electronic circuit, which can be external to interior 22. Alternatively, wireless connection is provided as known to persons of ordinary skill in the art. In some embodiments, plate 24 further comprises a thermal insulating material 26.

As noted, in some embodiments, sensing tube 16 is positioned partially within duct 10, such that one of its openings serves as an inlet 25 for ambient air, while the other serves as an outlet 27 in fluid communication with duct 10. Air flowing through sensing tube 16 dissipates energy from the space around both of sensors 30, 32, thus lowering the temperature at each sensor location. In some embodiments, sensing tube 16 is comprised of other features, for example interior 22 may be potted with thermally conductive epoxy (not shown), and heater 28, heated sensor 30, and unheated sensor 32 are affixed to an interior surface of plate 24 by techniques and methods known to persons of ordinary skill in the art, for example by soldering or with a suitable adhesive such as epoxy.

In some embodiments, heated sensor 30 is a thermistor, which is thermally sensitive to changes in temperature of ambient air flowing through interior 22. It will be noted that maintaining a temperature difference of no more than 5° C. provides significant advantages to the present embodiments, because less power is consumed to maintain such a difference than a system that requires, for example, a 50° C. temperature difference between the two sensors.

Generally, in operation, unheated sensor 32 remains at the temperature of ambient air flowing into and through sensing tube 16. However, heater 28 increases and maintains the temperature of heated sensor 30 to a predetermined level, e.g., 3° C.-5° C. above the temperature of ambient air flowing through sensing tube 16. If sensing system 15 is positioned downstream from filter 14, as shown in FIG. 1, then the effect of clogging in filter 14 generally pulls a greater volume of ambient air through sensing tube 16. This is because clogging of filter 14 tends to restrict air flow through the filter, resulting in a lesser volume of air downstream of filter 14 being pulled by blower 11. Consequently, a higher volume of ambient air is pulled through sensing tube 16, with corresponding increase in air velocity. Therefore, heater 28 supplies more voltage to maintain the fixed temperature difference, as the movement of greater volumes of air through sensing tube 16 dissipates more energy. Thus, the voltage required varies with, and is an indicator of, the clogging in filter 14.

Conversely, if sensing system 15 is positioned upstream from filter 14, these relationships are essentially reversed. In other words, with filter 14 being positioned between blower 11 and sensing tube 16, the extent of filter clogging tends to limit the amount of ambient air that contacts sensors 30, 32. As a result, less energy is dissipated, and voltage needed to maintain a fixed temperature difference is reduced.

Figure 4:
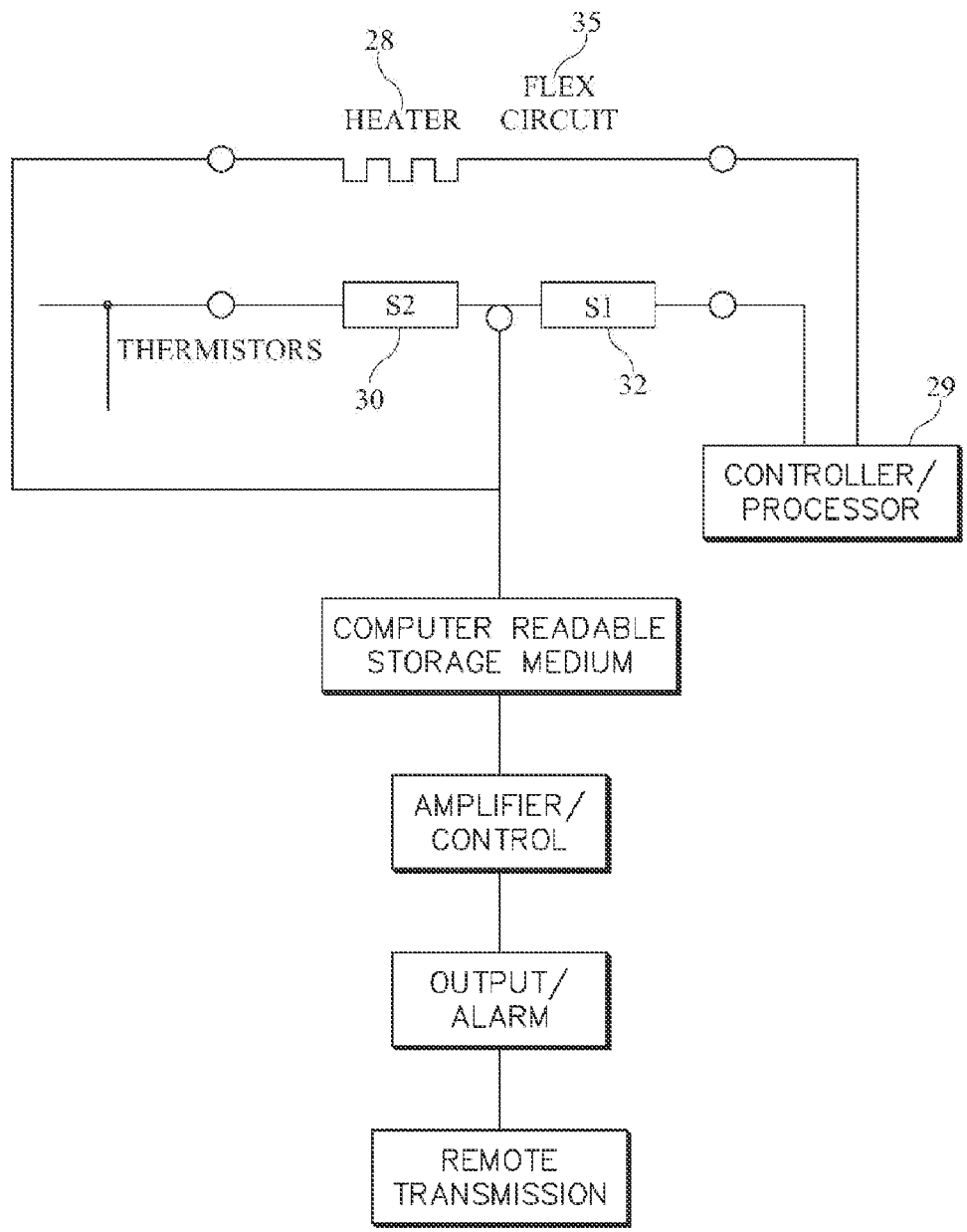
FIG. 4 is a circuit diagram depicting a sensing tube of the type illustrated in FIG. 3, according to multiple embodiments and alternatives.

FIG. 4 is a circuit diagram depicting a sensor of the type illustrated in FIG. 3, in connection with a clogging detector for a gas filter. Heated sensor 30, and unheated sensor 32, are represented by S2 and S1, respectively. Voltage required for maintaining a predetermined temperature difference between sensors 30, 32, as discussed above, is transmitted as sensor output of flex circuit 35 (which in some embodiments comprises a thermal insulator 26). In some embodiments, flex circuit 35 is electrically coupled to sensing system controller input, including a signal amplifier of the type as is known to persons of ordinary skill in the art. Because flex circuit 35 transmits a signal representing voltage for maintaining the temperature difference between sensors 30, 32, this value is indicative of the extent of clogging of filter 14. Alternatively, in systems that utilize differential pressure sensors, this output is indicative of pressure drop across filter 14, as a function of clogging.

As previously noted, filter clog detection involves the basic understanding that clogging limits or restricts the volume of air passing through a filter. However, in many HVAC systems, blower speed is another variable that may affect the volume of air passing through a filter. If all other factors are equal, then a higher blower speed produces more air flow through a duct generally, and through air (i.e., gas) filters positioned in the duct in particular. Consequently, there is a potential that changes in blower speed will mimic the effects of a clogged filter, or will hide the effects of a clogged filter. This could occur in several ways. One is when the blower is turned off. Having no air flowing through a filter, or anywhere else in the duct, would tend to mimic a filter that is substantially or completely clogged. Also, taking measurements when a blower is starting up, but has not yet stabilized to operating speed, may also mimic a clogged filter, or hide the effects of a clogged filter. Likewise, the same may occur if readings are taken when a blower is in the process of shutting down, and thus is operating at less than normal operating speed.

Some multi-speed blowers and variable air volume blowers (hereafter referred to together as "multi-speed blowers") automatically change speed in response to demand, for example to 50%, 80%, or 100% of the motor's capacity, in order to promote more efficient operation. A blower motor may operate at less than 100% on a mild day because it promotes efficiency to cool the building gradually. Consequently, even when there has been no appreciable change in filter condition over time, readings taken at an operating speed of 50% will differ from ones at 80%, or 100%, and such differences can potentially mimic filter clogging that does not exist, or hide filter clogging that actually does exist. However, while applicable to multi-speed blowers capable of operating at two or more speeds, these are not the same as variable-speed blowers which, in some cases, are capable of having a rotational speed of the blower motor that is continuously and infinitely controlled at very small interval adjustments of, for example, a variance of 1-2% in blower speed.

Figure 5A:
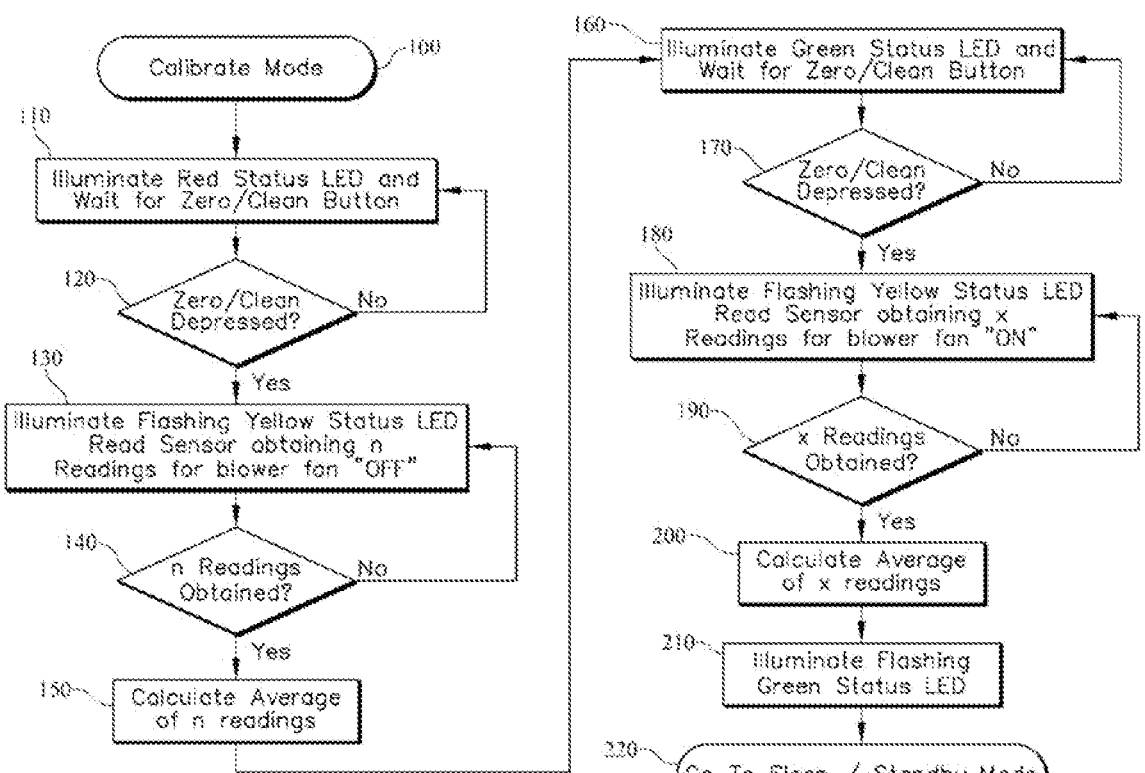
FIG. 5A is a flow chart related to calibrating a sensing system for use in monitoring a gas filter, according to multiple embodiments and alternatives.

In a HVAC system that utilizes a multi-speed blower, or two-speed blower, it is desirable to distinguish between readings that are useful for determining filter condition, versus ones that need to be discarded because of a tendency to mimic filter clogging, or hide the effects of clogging. FIG. 5 provides a flow chart showing various steps for promoting detection accuracy, according to multiple embodiments and alternatives. The steps relate to validating a measurement obtained during a monitoring event, either by determining that the gas blower was on, or verifying that the blower was at a stable operating speed, when a particular measurement was obtained, and/or verifying that the blower was operating at the same speed when a particular measurement was obtained relative to the blower speed at the time of a previous measurement. Such validation helps to prevent changes in blower speed from adversely affecting filter clog detection. Discussion is provided regarding calibration (FIG. 5A) and monitoring (5B to 5C) of filter 14, in a HVAC system in which sensing system 15 is positioned downstream of the filter.

Figure 5B:
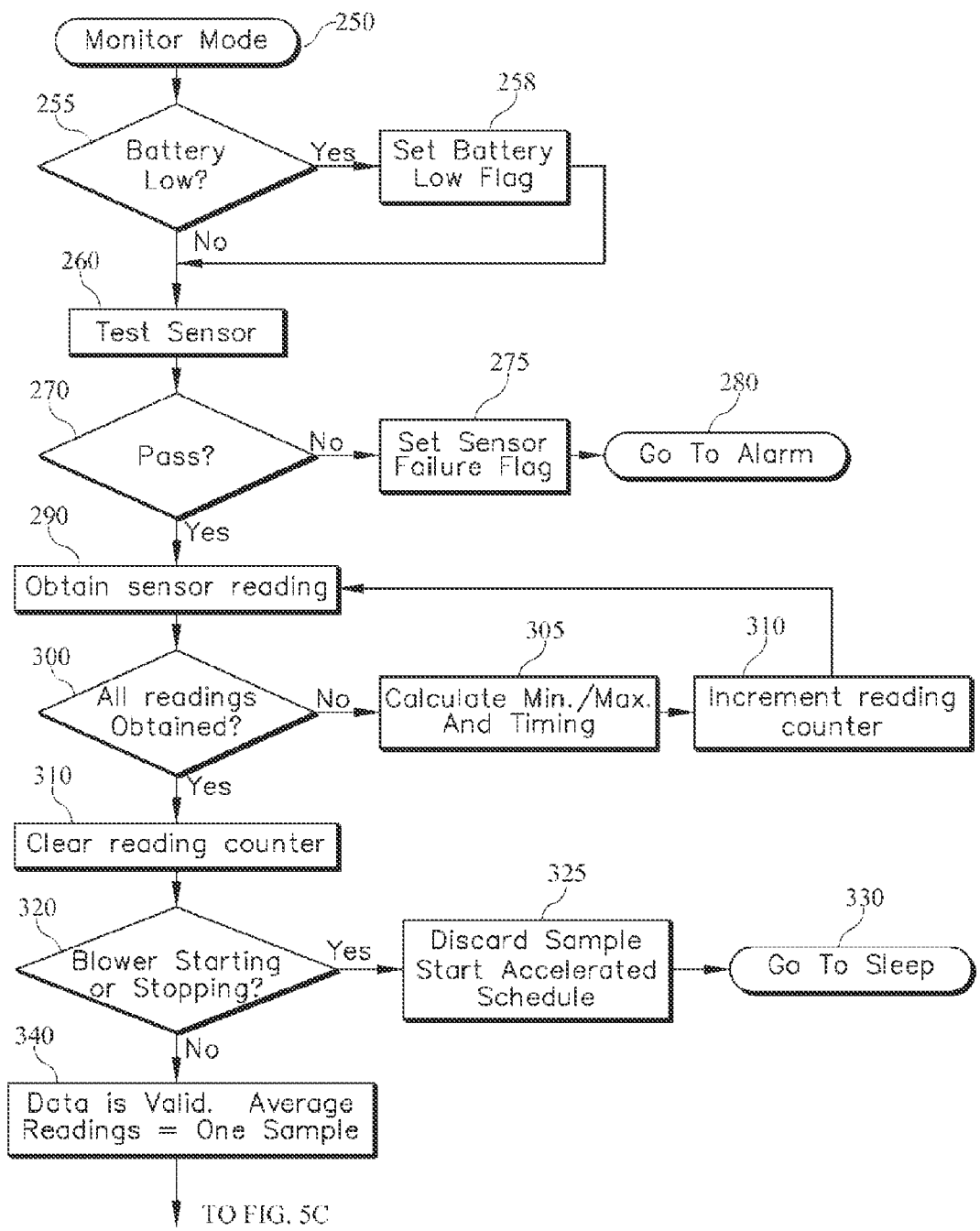
FIG. 5B-5C is a flow chart concerning monitoring of a gas filter using a sensing system, according to multiple embodiments and alternatives
Figure 5C:
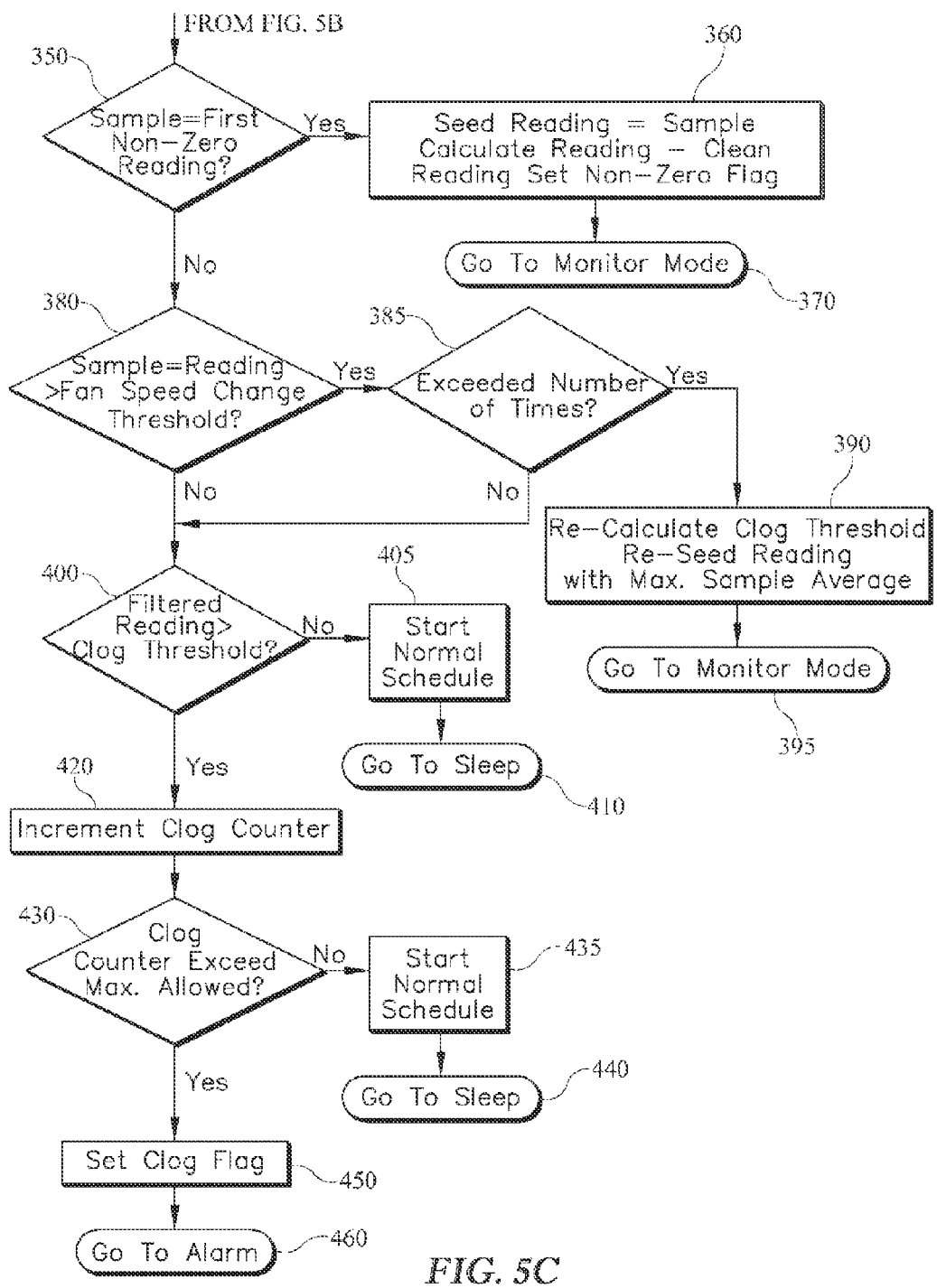

In some embodiments, calibration occurs either when a new filter is installed, or when an existing filter is cleaned. Steps 100 to 130 are for initiating the calibration process and for confirming that sensing system 15 is powered-up in order to obtain readings. The teachings and principles described herein regarding FIGS. 5A-5C are directed to sensing system 15, but can be adapted to sensor 20 in differential pressure systems, as well. Optionally, at step 120, a user obtains a value for the clean filter corresponding to zero air flow and/or to air flow when the blower is operating. For the latter, a user turns the blower fan on, for example by increasing or decreasing temperature setting at a thermostat (not shown). Preferably, a user then waits a sufficient period of time, for example 60 seconds, to ensure that the blower has stabilized to operating speed.

In some embodiments, the steps for obtaining a value for zero air flow involve taking a plurality of readings and calculating an average of the readings, as shown at steps 140, 150. Generally, a plurality of readings are obtained over a relatively short period of time, for example ten seconds, and then averaged. Accordingly, the phrase, obtaining a value, as used herein means calculating the average value for all readings in a sample during a particular monitoring event. As discussed below, an average of the values obtained from several monitoring events is also used in some embodiments.

Steps 160 to 210 depict obtaining readings for a clean filter with the blower operating. Upon completing calibration at step 210, values obtained during calibration are stored in memory, as are subsequently obtained values during monitoring, as explained in more detail below. Once calibration is completed, sensing system 15 transitions to standby mode (220) until the next scheduled monitoring event occurs. In this regard, a schedule of monitoring every twenty-four hours conserves energy and promotes efficiency compared to a schedule of every hour.

Once calibration is completed, periodic monitoring occurs beginning at step 250, according to a schedule determined by a manufacturer or, in some embodiments, as selectably desired by a user. The following example is with reference to sensing system 15, in which sensor voltage level (needed to maintain the predetermined temperature difference between sensors 30 and 32, respectively) is compared to a clog threshold value, which is stored in memory. Before doing so, however, various optional checks and tests are provided at steps 255 to 280, for example checking the battery (255) and providing an indication if the battery is low (258).

Similarly, proper sensor operation is checked (260) after applying power to sensing system 15 and enabling sensor voltage level detection. If voltage is detected at step 260, it indicates that the sensing system has passed this check (270). The sensing system will then proceed to step 290 to obtain readings. If voltage is not detected, then a failure flag is set at step 275. Optionally, the sensing system requires only one such failure before transitioning to alarm mode (280). In this way, indicator means include, but are not limited to, various kinds of alarms in the form of audible, visual, text, LED, and light cues. Alternatively, the sensing system is configured to require a predetermined number of attempts to detect voltage at step 260 before this transition. Preferably, alarm and indicator means are coupled to various means as are known to persons of ordinary skill in the art for transmitting signals to a remote location, including but not limited to via internet, via text message sent to a mobile device capable of receiving text messages (i.e., short message service format (SMS) or multimedia service format (MMS)), radio-frequency transmission, satellite transmission, or other similar methods.

In some embodiments, sensing system 15 then obtains readings (290), which are used to first determine whether blower 11 is on or off. Upon powering up the sensing system, an initial sensor voltage reading is obtained followed by at least one additional reading within about five seconds. Readings consistent with a step increase to a minimum of 2-3 volts, by way of example, for the initial reading, followed by a ramping decrease to a reading that is approximately equal to the value stored in memory from the prior monitoring event, indicate that the blower is on. Conversely, readings consistent with a step increase, as above, but followed by a ramping decrease to below 1.0 volts, again by way of example, within about five seconds, indicate that sensing system 15 is operating properly, but that blower 11 is off. In such event, the sensing system automatically ceases monitoring, and returns to standby mode until the next scheduled monitoring.

Preferably, the sensing system is programmed to monitor on an accelerated schedule once it determines that the blower is off, rather than waiting until the next monitoring opportunity according to a normal schedule. An accelerated schedule is repeated at different and more frequent intervals than the normal schedule, and continues until an indication is received that blower 11 is on, or until a predetermined maximum number of times to run the accelerated schedule has occurred.

If the initial sensor voltage reading and the one immediately following indicate that the blower is on, then optionally, a delay is provided between steps 260 and 290 before additional readings are obtained. As previously described, when readings are obtained (290), sensing system 15 calculates an average of a plurality of readings in order to obtain a value. For example, the number of readings may be sixty-four in about a ten second period, or some other number of readings within a given period of time. At step 300, sensing system 15 determines whether the predetermined number of readings has been obtained. Minimum and maximum readings are determined, as well, and the timing of each one stored at step 305. With each reading, a reading counter is incremented until the appropriate number of readings has been obtained, at which point the reading counter is cleared at step 310.

Sensing system 15 then compares readings obtained during the particular monitoring event to determine whether blower 11 was operating at a stable speed when the readings were obtained, or whether it was in the process of starting or stopping (320). For example, if the maximum and minimum readings at step 305 differ by more than a predetermined set amount then it indicates that blower 11 was not operating at a stable speed during the entire period (e.g., ten seconds) when those readings were obtained. This may be due to the fact that blower 11 was in the process of starting up, or shutting down. In both cases, the speed of blower 11 typically will change within a relatively short period of a few seconds. In any case, such a value is discarded (325), and present monitoring ends (330) pending the next monitoring event according to an accelerated schedule (325).

In some embodiments, if sensing system 15 is configured to maintain a 5° C. temperature difference between heated sensor 30 and unheated sensor 32, then a difference of about 0.250 volts or greater between the minimum and maximum readings would cause the sensing system to discard the sample (325). Conversely, if that difference is less than or equal to about 0.250 volts, then sensing system 15 considers the readings to be valid, and the sample and its value are not discarded (340). If a blower starts up at the instant a monitoring event begins, or while a monitoring event is ongoing, then the blower will be running fastest when the last readings are obtained. Conversely, if it shuts down at the instant a monitoring event begins, or while a monitoring event is ongoing, it will be at its slowest speed when the last readings are obtained. Accordingly, at least one reading from a group of the last ten readings (if set to obtain a value based on an average of sixty-four readings) must be reflected in the difference between maximum and minimum.

Optionally, at this point sensing system 15 compares (not shown in FIG. 5) the value obtained during a monitoring event to the value for zero air flow obtained at calibration and stored in memory. If the averages are substantially identical, for example within, about ±0.50 volts, this indicates that blower 11 is off. This prompts an accelerated schedule to be initiated, if not already started due to readings at step 320.

If it is determined that blower 11 was on when the readings were obtained, and not in the process of starting up or shutting down (320), and that a sufficient number of readings were obtained (340), then a sequence generally provided at steps 350-390 occurs next. From prior monitoring events, at least one known valid value is stored in memory, indicating voltage needed to maintain the predetermined temperature difference at a particular blower speed (360) for a particular filter condition. If many monitoring events occurred consecutively without a change in blower operating speed, then an average of the most recent of such values (up to a predetermined number) is stored.

Changes in fan speed typically occur when a HVAC system transitions from winter heating to summer cooling, or vice versa, or when the HVAC system controller changes blower speed, as programmed, to increase HVAC system efficiency. Such transitions occur frequently at various times of the year in various places in the country. One advantage of the present embodiments is that, for HVAC systems with two-speed blowers, or multi-speed blowers, a dynamic clog threshold can be provided based upon a fan speed offset value. At step 380, if a difference exists to a predetermined level, between values stored in memory at calibration representing a clean filter, on one hand, and a stored value obtained during recent monitoring events, on the other, then this is an indication that blower fan speed has changed. Depending on the positioning of sensing system 15 relative to filter 14, this difference will either represent a rise in measured voltage, or a drop in measured voltage.

For illustrative purposes, suppose the voltage measured at the time of calibration (for a clean filter) was 2.0 volts, and a clog detection threshold of 0.150 volts above the clean filter value, i.e., 2.150 volts. Further suppose, at a certain point in time, that 2.1 volts is a stored value representing an average of values from the most recent valid monitoring events (referred to as S, below). If the next monitoring event obtained a value of 2.38 volts (represented for discussion purposes as X, which is 0.280 volts greater than the S value), that would be a significant difference over both the clean filter value at calibration and the average of the most recent valid monitoring events (S).

However, sensing system 15 is configured in some embodiments to proceed to a next monitoring event, without triggering alarm mode, and without recalculating the clog threshold, and without factoring the 2.38 volts into the average of values for the most recent valid monitoring events. Instead, the sensing system proceeds to the next monitoring event. Now, suppose that value is 2.4 volts (Y), which is again a significant upward movement. If the sensing system is configured to evaluate for fan speed change after three consecutive non-zero air flow values representing dynamic shifts in the value, then the sensing system still would not take any action in terms of these values. Instead, the sensing system would proceed to the next monitoring event.

Then, in the present example, only if the next monitoring event resulted in a third consecutive non-zero air flow value (Z), would the dynamic features of the sensing system come into play. Now, suppose that the next monitoring event obtained a value of 2.42 volts. This would be the third consecutive non-zero air flow value representing an increase of at least 0.250 volts above the S value (380, 385). In that event, four things would happen. First, the sensing system would sense this as a fan speed change. Second it would discard the values that produced the 2.1 volts (S) value, which had been stored in memory. Third, it would recalculate the clog threshold, to account for the change in fan speed (390). Fourth, it would re-seed (i.e., replace in memory) the values that had previously produced the 2.1 volts (S) value (also 390).

Step 390 calculates the average value by which values X, Y, and Z exceed the S value for the current filter state. This would produce an average of (0.38 volts+0.4 volts+0.42 volts)/3=0.4 volts. The sensing system then uses this average for both calculations at step 390. Specifically, the clog threshold would increase from 2.150 volts to 2.550 volts, and the average of values from the most recent monitoring events would increase from 2.1 volts to 2.5 volts. In this way, it will be appreciated that before the fan speed change, the average of values from recent monitoring events was 0.050 volts from the clog threshold (2.150 volts−2.1 volts), and after the fan speed change it is the same (2.550 volts−2.5 volts).

At step 400, values are obtained and stored in memory with respect to averaged samples, and the values are compared to a clog threshold stored in memory. For example, this threshold may be set at 0.150 volts above or below a stored value of a clean filter based on calibration readings. If it is determined at step 400 that the average of the readings obtained is greater (or less, depending on the upstream/downstream position of the sensing system) than this clog threshold, then a clog counter is incremented at step 420. At step 430, if the clog counter has consecutively exceeded the clog threshold a predetermined number of times, for example three times, then system 15 activates an alarm or a similar signal at step 460, which may include one or more visual or audible indications. If, however, it is determined at step 400 that the average is less than or equal to the clog threshold, or if the clog counter has not exceeded the maximum number of times that is set (430), then sensing system 15 returns to its normal schedule as indicated by step 405. In such case, power to the sensing system is discontinued to at step 410 (until the next scheduled monitoring event) and transition is made to standby mode (440).

By programming processor 29 with appropriate Instructions to compare readings and values, and discard certain values while using others, as described herein, it removes the need to have separate sensors detecting either the speed of the motor attached to blower (11) or of the air flow in duct 10, or both. Further, it enables sensing system 15 to determine the condition of filter 14 without requiring substantially high temperature increases between sensors 30 and 32, respectively.

Figure 6:
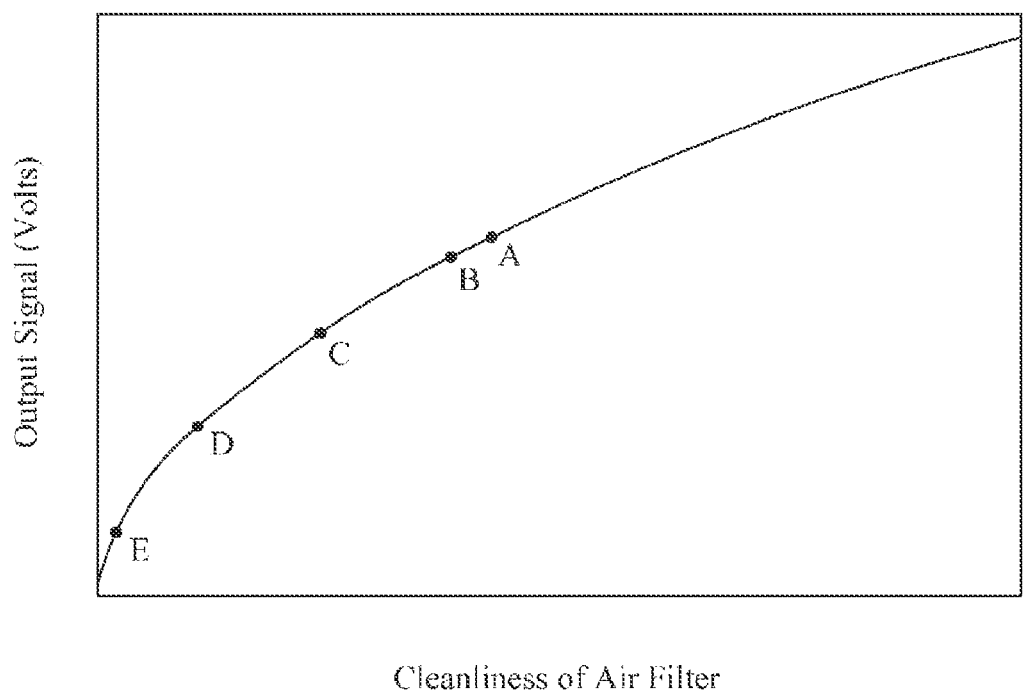
FIG. 6 is a graph that plots sensor voltage level against the level of cleanliness of a gas filter in a HVAC system, according to multiple embodiments and alternatives.

As shown in FIG. 6, a graph plots sensor voltage level against the level of cleanliness (i.e., in terms of the absence of dirtiness and/or clogging) of a gas filter in a HVAC system. Moving from along various points shown on the graph provides a continuum from a clean filter at the time of replacement or cleaning (A), to a dirty filter (B), to a moderately clogged filter (C), to a substantially clogged filter (D), and finally to a completely blocked filter (E) in which no air passes through. Preferably, a clog threshold is determined between points B and C. In some embodiments, that threshold is responsive to the stable operating speed of a blower at the time when voltage readings are obtained.

With further reference to "Monitor Mode" beginning with step 250 and discussed in connection with FIG. 5B and FIG. 5C, what follows are three non-limiting examples of how information about filter condition or the status of the detector is conveyed and received: through visual and/or auditory signals perceptible to humans which are provided at the sensing system 15 itself; through electronic communication initiated by sensing system 15 in combination with a notification system 110, producing "Alert Messages"; and through electronic communication initiated by sensing system 15 in combination with a notification system 110, producing "Notification Reports."

Visual and/or Auditory Signals Provided at the Sensing System

In some embodiments, information about filter condition or the status of the detector is conveyed visually at sensing system 15 itself, or as an audible signal emanating from sensing system 15, or both. For example, with respect to visual indicators, a flashing green status light on a front panel 18 of sensing system 15 may be employed to indicate Normal Operation of the sensing system. In some embodiments, flashing is by switch means prompting a light emitting diode (LED) to alternate between an illuminated state and a non-illuminated state. A flashing red light may be employed to indicate Clogged Filter. A flashing yellow light may be employed to indicate Low Battery. A continuous red light may be employed to indicate Sensor Failure, for example if no voltage reading is detected. In some embodiments, visual indications are provided with a LED integrated within sensing system 15 and controlled by processor 29, and which is visible through an opening of a panel (not shown) of the sensing system 15. Optionally, an audible signal is employed, in the form of an alarm sound which is arranged to occur if a particular threshold is exceeded as at step 400.

Electronic Communication Producing "Alert Messages" and/or "Notification Reports"

Accordingly, sensing system 15 is capable of operating as a stand-alone detector. However, it may also be configured to connect to the Internet as a component of a notification system. Various methods including those described here can be selected for this purpose. In some embodiments, sensing system 15 further comprises a networking module 105, which facilitates connection to the Internet and in some embodiments does so via wireless networking technology such as through radio frequency transmission. It will be appreciated that pathways and protocols for connecting sensing system 15 to notification system 110 are not limited to specific embodiments described below. Rather, multiple options exist for doing so, and are known in the art, including but not limited to standard cable connectors such as RJ-45 providing ethernet connections for network communication. Once connected, data and information from sensing system 15 may be exchanged as packets across a network according to one or more of several optional protocols as selected by a user, e.g., Transmission Control Protocol/Internet Protocol (TCP/IP).

Generally, sensing system 15, which includes module 105, is battery-powered or, alternatively, may be powered by connection to a standard electrical outlet via a suitable power adapter. For configurations that employ a wireless router 102 as an access point, as in FIG. 8, it is advisable to test the Internet connection and locate the wireless router suitably to limit obstruction due to walls, floors, ceilings, and objects in the signal path.

Information related to the condition of gas filter 14 is transmitted from sensing system 15 to a notification system 110 for storage and processing, and in some embodiments notification system 110 is cloud-based. As described below, under certain conditions communications are generated from such information, and transmitted to a recipient (Alert Messages) or made available over a web server (Notification Reports). As with cloud computing in general, such a configuration allows for the computing activity to be transitioned from the local sensing system 15 to a remote hosted server or servers thereby gaining efficiencies due to the distribution of hardware and software resources and functions to the remote notification system. Often, the at least one server further comprises a processor 29, which stores the computing application or applications along with their respective Instructions, which execute upon the information transmitted from sensing system 15.

Figure 7:
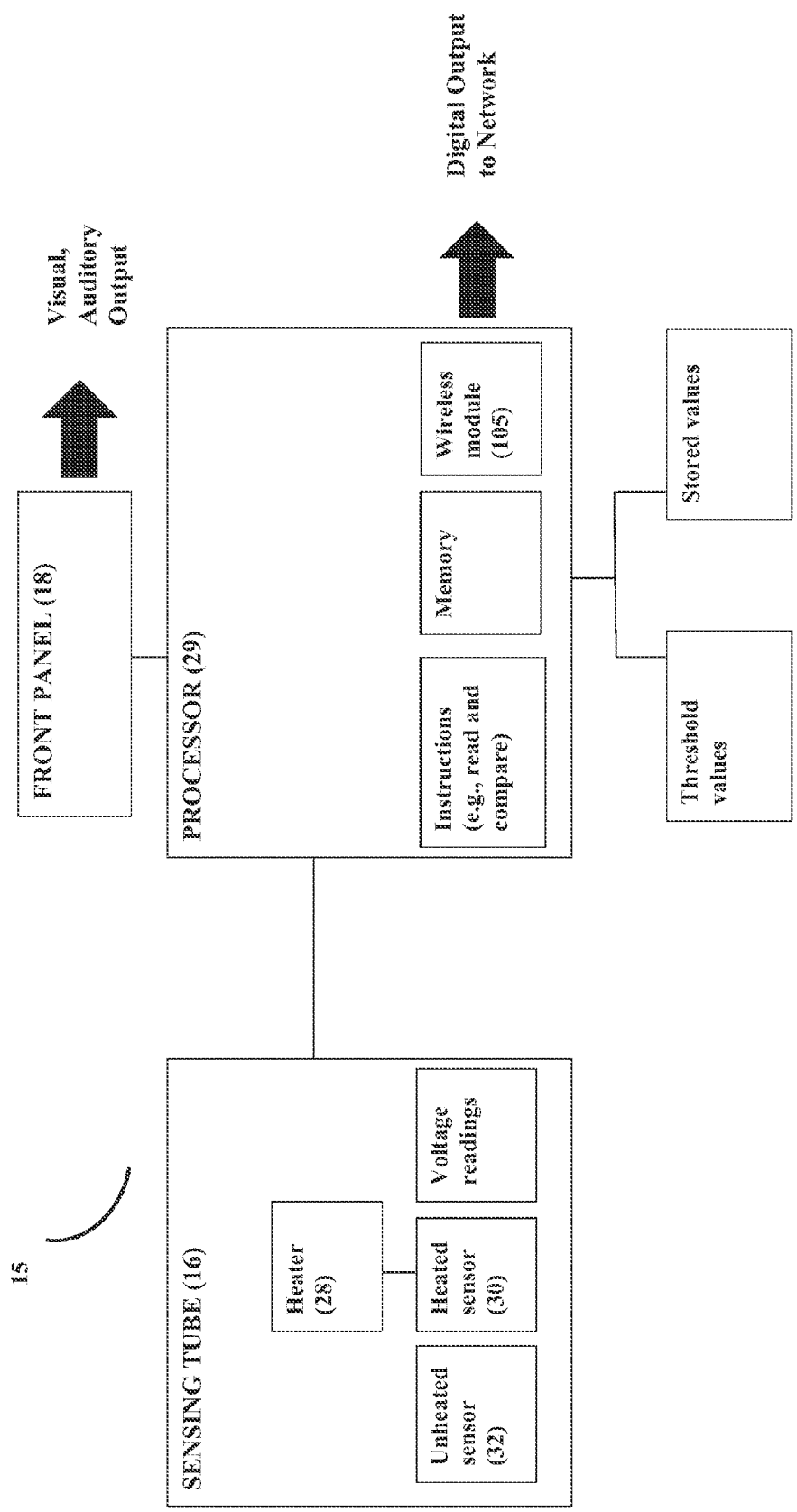
FIG. 7 is a block diagram representing a sensing system and notification system, according to multiple embodiments and alternatives.

FIG. 7 is a block diagram which further depicts the flow of information occurring within the components of sensing system 15, according to various options and embodiments herein. The block associated with sensing tube 16 depicts the sensing tube within which is positioned sensors 30, 32, and from which voltage readings are obtained for purposes of maintaining the predetermined temperature difference discussed above, for example in connection with FIG. 3 and FIG. 4. The block associated with processor 29 further depicts software the processor executes, including Instructions for making the step 400 comparison based on values stored in memory. Module 105 is then involved with providing digital output via a network as further described herein. It will be appreciated that processor 29 and module 105 are involved in the flow of communication, and in this sense share a connection, but the scope of embodiments is not limited to and does not otherwise require the module 105 to be located within processor 29. The digital output initiated by module 105 involves signals being transmitted, as distinct from the visual and auditory output emanating from front panel 18, as also depicted in block form in FIG. 7.

In some embodiments, sensing system 15 is set up to remain in standby mode for long durations, conserving power. Its activity is initiated periodically at selected intervals to monitor for alarm triggers, which by way of non-limiting examples may include Clogged Filter, Low Battery, and Sensor Failure. If no such alarm triggers are detected, the sensing system then returns to standby mode until the next interval. Optionally, sensing system 15 is configured with a "SEND" button that, when manually depressed, the system transmits its information to notification system 110.

Figure 8:
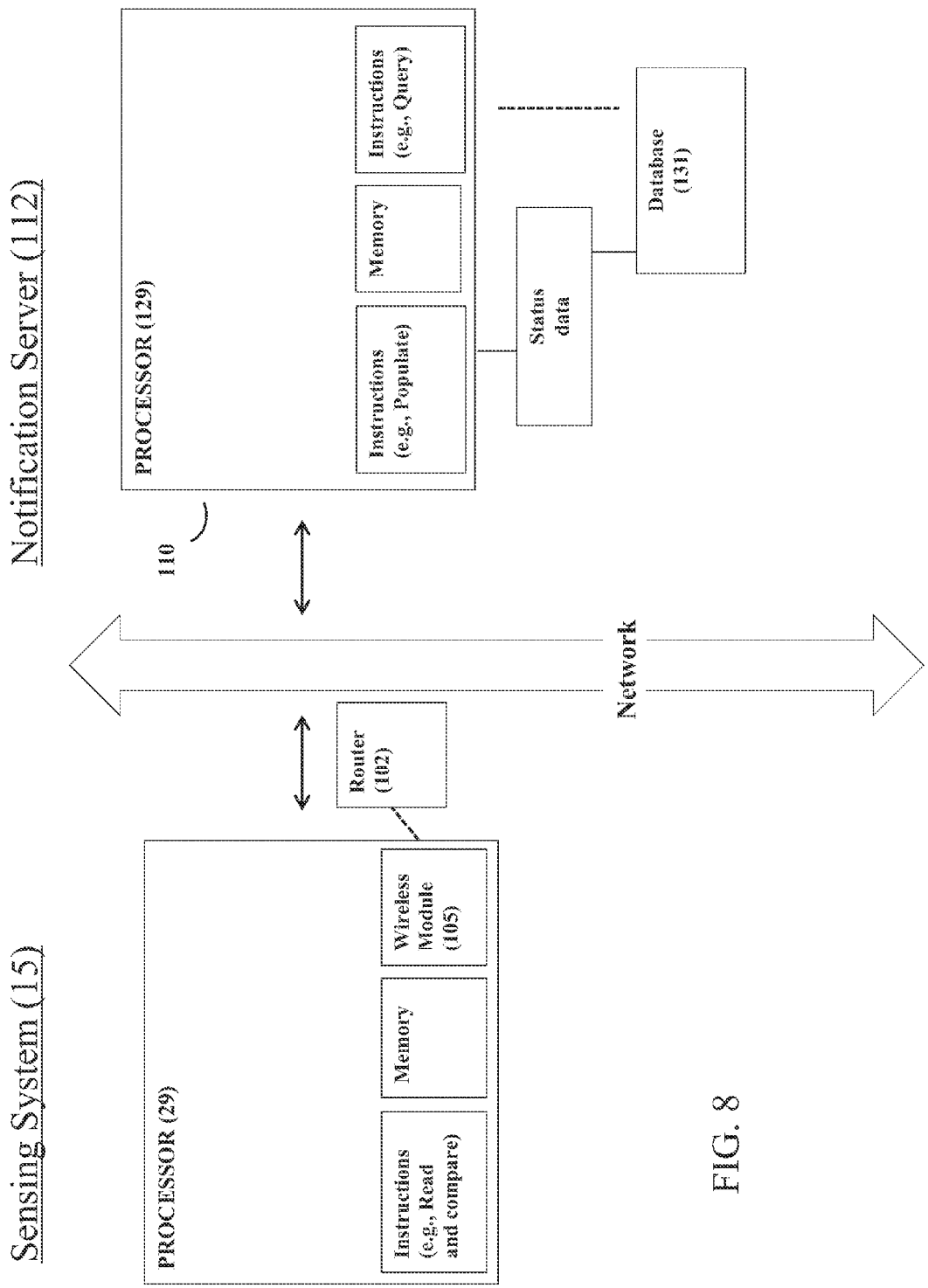
FIG. 8 is a chart illustrating flow of information from a sensing system to a notification system by which alert messages and notification reports are produced, according to multiple embodiments and alternatives.

With reference to FIG. 8, in some embodiments connection between sensing system 15 and notification system 110 occurs via wireless router 102, which is also referred to herein as an "access point." In some embodiments, wireless communication is accomplished via radio frequency transmissions, according to or consistent with IEEE 802.11, e.g., with module 105 of sensing system 15 transmitting through access point 102 at a frequency of 2.4 GHz (gigahertz). In some embodiments, access point 102 for connecting module 105 to the Internet is a wireless WiFi® router, which in turn is connected to Internet service by a conventional cable modem (not shown). Such routers and modems are commonly known to persons of ordinary skill practicing in the pertinent field, and their use generally requires a subscription with an Internet Service Provider. Transmitted information from sensing system 15 is processed by the notification system 110 for determining whether an alarm trigger exists, and if so generating and sending an Alert Message.

In some embodiments, the notification system 110 comprises a web server 112 or servers for which the host has obtained a subscription with an Internet Service Provider, by which the web server(s) 112 connects to other servers. Generally, IEEE-compliant gateways, bridges, and other hardware as known to persons of ordinary skill in the art are employed for wireless transmission from sensing system 15 to notification system 110 via the Internet.

In some embodiments, when sensing system 15 is manufactured, it is assigned a unique Media Access Control address, hereafter referred to as a "MAC Identifier" specific to that sensing system. This identifier enables the connection from module 105 of sensing system 15 via access point 102 to one or more cloud-based servers 112 providing database storage and processing functions, and which include at least one processor 129. Server 112 is involved with transmitting Alert Messages and Notification Reports (as further described herein), containing information about the status of a gas filter in proximity to and monitored by a particular sensing system 15 identified by its MAC Identifier. In some embodiments, a MAC Identifier is incorporated within the address associated with sensing system 15, according to conventional addressing and communication protocols, enabling the server 112 to recognize and communicate with sensing system 15, and otherwise providing a basis on which server 112 (or, servers) should accept and process data transmissions from sensing system 15.

In some embodiments, the network is configured for access point 102 to connect to a network, which can be through a modem connection, or over a wireless local area network (WLAN), or through other similar means. In some embodiments, the system is configured so that the act of connecting sensing system 15 with access point 102 results in the assignment of an internet protocol (IP) address to sensing system 15, as known in the art. Whether direct Internet connection occurs via modem linking access point 102 to Internet, or connection is initiated first through a local area network and then to Internet by modem, sensing system 15 is thus connected to notification system 110 including server 112. Once configured in this way, sensing system 15 transmits signals indicative of filter condition specific to clogging and sensing system condition to server 112, which receives, stores, and processes signals transmitted from the sensing system.

Figure 10:
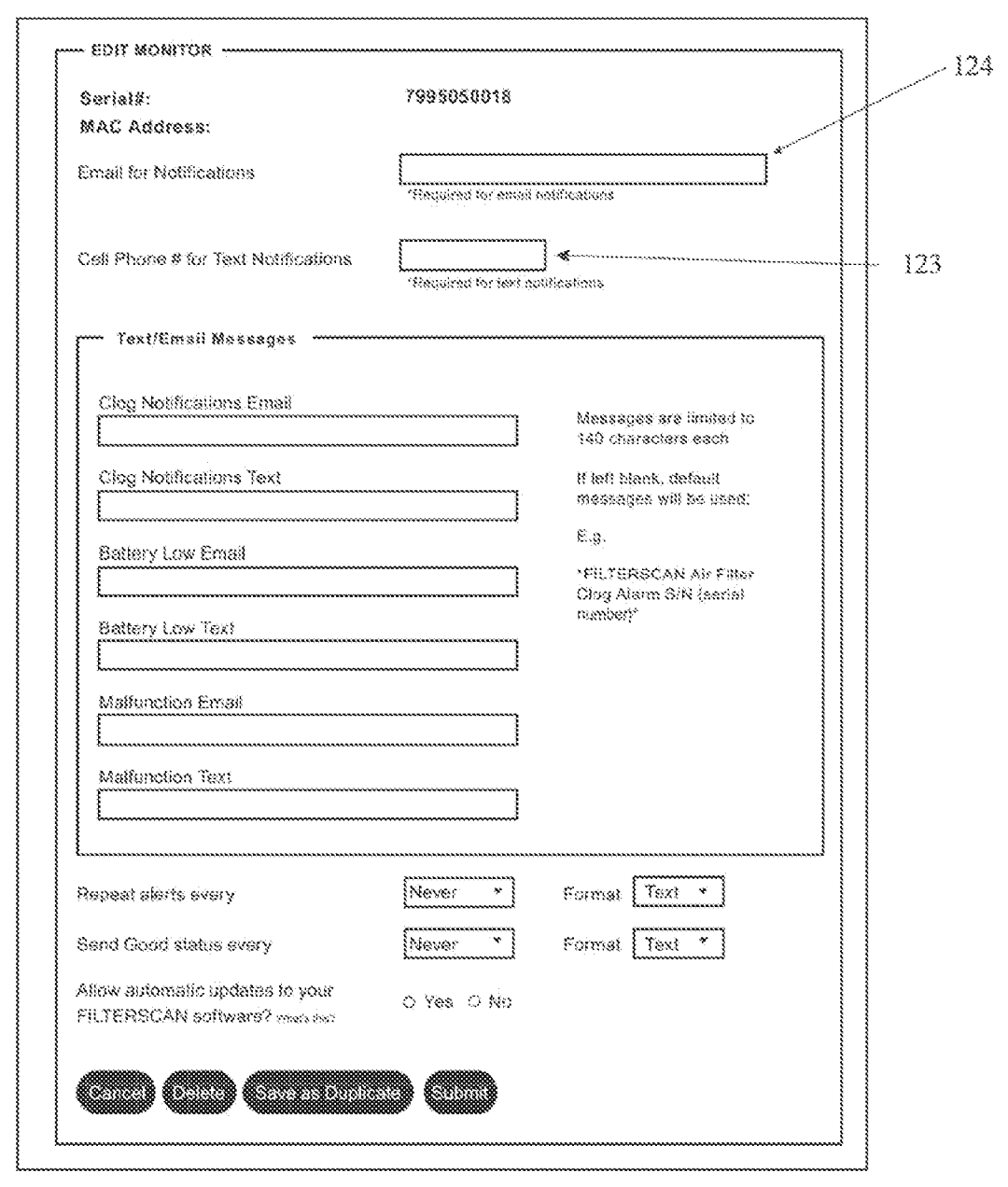

Some embodiments include a step of registering each particular sensing system 15 configured for communication with server 112. Registering is generally accomplished over the Internet with an account that one logs into and into which one or more MAC Identifiers is input. According to an example registration module, a user is directed to first enter profile information, such as user name and company name and contact information, and which may also include a field for payment information according to a specific user account. After doing so, FIG. 9 depicts a series of options provided by the registration module, one of which is an "Add Monitor" option 122. Here, a user would input identification data such as the sensing system's serial number and MAC Identifier, so that data can later be stored and processed specific to that particular sensing system unit. As FIG. 10 shows, registration also may include specifying the language and content for alert messages which are to be generated and sent, and their form of delivery, e.g., text messages, email, or both. According to which form(s) of delivery is specified, a user will then enter a phone number(s) in space 123 for alert messages by text (SMS or MMS), or e-mail address(es) in space 124 for alert messages by email, or both. Additionally, as further shown in FIG. 10, the registration module directs a user to input what type of alert messages shall be sent for various alarm triggers, again by way of non-limiting examples, for any or all of Clogged Filter, Low Battery, and Sensor Failure, and to input the quantity and frequency with which an alert message will be sent following the detection of one of those conditions. In some embodiments, as FIG. 10 shows, the frequency and content of Alert Messages may also be established at registration. Generally, registration is performed for each individual sensing system 15 that will communicate via the notification system 110. As desired, the setup for any given sensing system may be edited at any time with use of the "Edit Messages" option 119 in FIG. 9.

Figure 11:
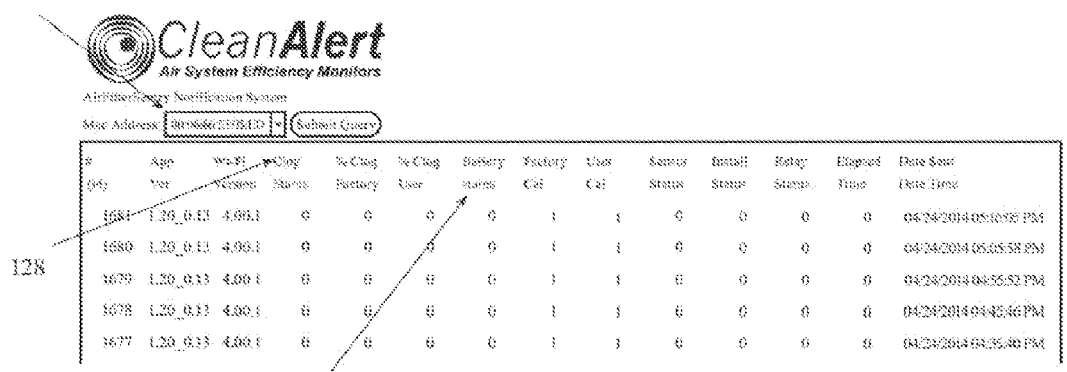
FIG. 11 represents a database, configured for storing status data as part of a notification system, according to multiple embodiments and alternatives.

In some embodiments, the notification system 110 is configured to send an Alert Message to a user device when a filter is clogged. Following setup and registration, sensing system 15 through its module 105 connects to access point 102, providing for transmission of signals representing information about a condition detected by the sensing system to notification system 110 on a periodic basis as selected. Signals corresponding to values are transmitted to and stored in database 131. FIG. 11 depicts the organization and content of database 131 in an embodiment. The content stored in each row of database 131 correlates to a particular sensing system matching a particular MAC Identifier as shown in space 127.

With reference back to FIG. 5C, step 400 involves reading a value of the voltage required for maintaining the above-mentioned predetermined temperature difference, and comparing it to a clog threshold stored in memory of sensing system 15. If it is determined at step 400 that the average of readings obtained is greater (or less, depending on the upstream/downstream position of the sensing system within the gas conduit) than the clog threshold, a clog counter is incremented at step 420. At step 430, if the clog counter has consecutively exceeded the clog threshold a predetermined number of times, for example three times, in operation sensing system 15 transmits a signal representing that finding to notification system 110 for storage and further processing by server 112. In some embodiments, a binary system is employed in which a first number represents a determination of an alarm trigger and a second number represents the absence of an alarm trigger. For example, "1" is used to indicate a positive finding consistent with a Clogged Filter at step 430, otherwise, the numeral "0" is used to indicate no such finding. Alternatively, non-numeric forms of information could be employed, provided they are discernible to machine readable and executable instructions. For example, the word "good" could be used instead of "0," or the word "clogged" instead of the number "1." At each monitored interval, one or the other of these values is inserted under "Clog Status" column 128 as part of the aforementioned database. In this respect, the use of "1" and "0" values provides status data, in which the status data is populated into a database 131 of server 112 for storage and processing. The use of "0" and "1" values minimizes server time and conserves bandwidth on the notification system.

At intervals according to how frequently one desires, e.g., twice daily, Instructions stored on processor 129 query database 131 represented in FIG. 11. For example, with respect to column 128, labeled "Clog Status," in some embodiments the query Instructions are programmed to differentiate between "0" and "1" values. Processor 129 in turn interprets "1" to represent that an identified filter was clogged at a particular date and time noted on the right of the figure. The MAC Identifier shown in box 127 is associated with a specific sensing system 15, and each sensing system is positioned proximal to an individual filter, the position of which is known and, therefore, the location of which is able to be tracked when practicing these embodiments. In this sense, for a sensing system 15 to be considered proximal to an individual filter, the sensing tube 16 must be sufficiently close to the filter so that the amount or velocity of ambient air from outside duct 10 flowing through inlet 25 of the sensing tube affects the voltage read by the sensing system.

Accordingly, the MAC Identifier matches the status data which has been queried to the particular sensing system(s) 15 which reported a Clogged Filter condition to point out the location of the subject filter. Likewise, the same would be true of pointing out filter location for other alarm triggers, e.g., Low Battery and Sensor Failure. The identification of a "1" during the query results in an Alert Message informing that the filter matched to the identified sensing system 15 is clogged or has encountered some other alarm trigger according to columns which are configured. The Alert Message can be worded according to how a user desires, in connection with FIG. 10. For example, a user may desire for the Alert Message to also state that filter service is needed, or to place a time limit on when the filter must be changed. Thus, the use of "0" and "1" or alternative binary values that notification system 110 processes, combined with predetermined content for the Alert Messages, minimizes server time and conserves bandwidth on the server.

Notification system 110 is configurable to send Alert Messages to a variety of devices or destinations, non-limiting examples of which are a cellular telephone, an email account accessed via personal computer or tablet, and a printer. Once an alarm trigger is identified by querying the status data according to Instructions, the act of transmitting the Alert Message itself may employ various base transceiver stations, towers, gateways, and other components for wireless connection, which are known in the art.

During registration, users may also arrange for online accessing and reviewing of filter information obtained from sensing system 15 in the form of Notification Reports. This type of access may require a separate subscription, which allows a user to log into a dedicated web page and access information stored on server 112. In an example embodiment, user-specific accounts may be setup at https://www.cleanalertwifi.com or a similar type of webpage.

Figure 12:
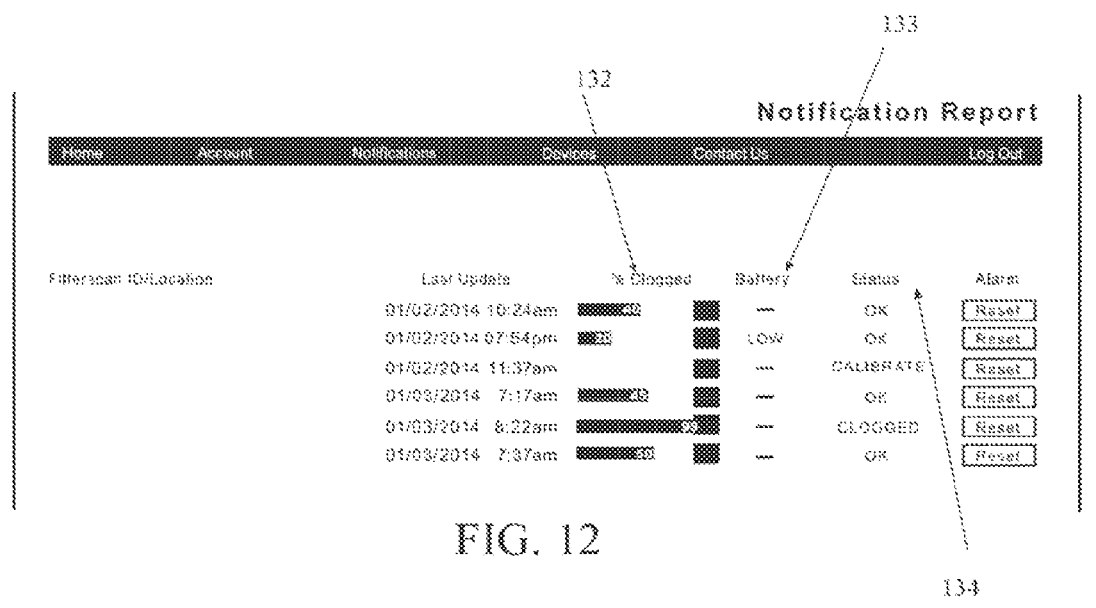

FIG. 12 provides an example Notification Report. A Notification Report provides additional information beyond stating that a filter is clogged, or a battery has little remaining charge, or that the sensing system is not transmitting voltage readings or otherwise functioning properly. By comparison, Notification Reports make additional filter status information available periodically according to selected data points. One example of such information is the time until service is needed (clean or replace the gas filter). Notification Reports can be more tailored to the unique environment of a particular filter, than a manufacturer's standard recommendation of 3 months, for example. This is because a "dirty" environment may require service every two or three weeks, while a very "clean" environment may not require service for nearly a year, and, therefore, it may be desirable for the Notification Report to provide more specific information related to the condition of a filter. In addition, the thermostat temperature setting also affects filter life, in that a higher temperature setting in winter with the heater on forces the HVAC system to run longer, causing the filter to become clogged in a shorter amount of time. The same may be true when the thermostat is set to very low temperatures in hot summer months with the air conditioning on. In some embodiments, it is possible for a gas filter to reflect greater than 100% clogged, based on specific conditions and the length of time between service. These are additional factors influencing content of the Notification Report, which notification system 110 allows a user to access and view online.

In some embodiments, a "1" in the "Clog Status" column 128, as represented in the database depicted in FIG. 11, indicates the existence of a 100% clog. This initiates the status of "Clogged" as shown in the "Status" column 134 of FIG. 12. Likewise, a "1" in the "Battery" column 126 of the database represented in FIG. 11 indicates a low battery, and may serve as the basis for reporting in a Notification Report the status of "LOW" as shown in the "Battery" column 133 of FIG. 12

With respect to the "% Clogged" column 132 of FIG. 12, a value of 100% would correlate to a "1" in the "Clog Status" column 128 of the database represented in FIG. 11. However, it is also possible for the value in column 132 of FIG. 12 to exceed 100%. This could occur, for example, if a user ignores a prior Alert Message or Notification Report indicating a clog and continues using the filter beyond the "100%" clog value. In addition, various options exist for configuring sensing system 15, with respect to how frequently a filter connected with a particular sensing system 15 should be changed. In some embodiments, a dial (not shown) is provided with a setting in the middle, reflecting the level of clogging when the filter should be changed according to factory recommendations. The user would have the option of adjusting the dial toward the "less often" (i.e., less often than factory recommendation schedule), or alternatively, toward "more often." Depending on how far the dial turned and in which direction, it would alter the point at which a "clogged" filter is sensed. This, in turn, would alter the point at which a "1" appeared in column 128 of FIG. 11, and at which a value of "100%" appeared in column 132 of FIG. 12.

In an example embodiment, voltage readings are saved based upon initial differential pressure (a pressure drop that occurs across the filter from the upstream side compared to the downstream side) at calibration, and then compared to later voltage readings. At the middle setting of the dial, an alarm trigger would result when differential pressure rises to two times the initial differential pressure at calibration, based on voltage readings. Optionally, one might turn the dial toward "less often" or "more often" resulting in a different voltage reading required for an alarm trigger. It will be appreciated that having the sensing system 15 upstream or downstream of the filter determines whether the voltage must be higher or lower than at calibration for the alarm trigger, but the voltage difference will be proportional to the distance the dial moves from center.

Continuing the example embodiment, suppose the percentages shown in column 132 of FIG. 12 are associated with positioning the dial at its middle setting. A 95% value in this column would correlate to a change in the average voltage reading (compared to at calibration) which is 95% of the change that would be associated with a doubling of the differential pressure. If the dial were positioned, however, toward "less often" then this value of the column would be less than 95%, depending on how far the dial moved from center. In this example embodiment, rather than transmitting a binary value, the networking module 105 transmits a representation of the numerical percentage which is processed according to Instructions on second processor 129, and represented as numbers shown in column 132 of the FIG. 12 notification report.

Persons of skill in the art will appreciate that many different kinds of data structures and columns consistent with FIG. 12 can be established to capture and report upon various kinds of data collected about the condition of the filter and the sensing system. The categories reflected in columns 132, 133, and 134, respectively, as shown in FIG. 12, are not meant as limiting.

As previously stated, Notification Reports are generally accessible online. As desired, a user may access a Notification Report for a sensing system corresponding to a particular MAC Identifier by logging onto the Internet with a computer, a tablet, an intelligent phone, and the like then inputting a predetermined web page according to a specified Uniform Resource Locator (URL), and specifying the particular MAC Identifier(s) associated with the registered account for which information is desired.

The teachings and principles described herein are useful in a wide variety of systems in which gas is moved, and particles are captured in a filter. These include, but are not necessarily limited to, gas filters for conduits in homes and buildings, and gas filters for passenger compartments in automobiles, airplanes, and other closed spaces which people occupy, as well as industrial processes which require the movement of gases through a conduit.

It will be understood that the embodiments described herein are not limited in their application to the details of the teachings and descriptions set forth, or as illustrated in the accompanying figures. It will be understood by those having ordinary skill in the art that modifications and variations of these embodiments are reasonably possible in light of the above teachings and descriptions. The descriptions herein are not intended to be exhaustive, nor are they meant to limit the understanding of the embodiments to the precise forms disclosed. Accordingly, the foregoing descriptions of several embodiments and alternatives are meant to illustrate, rather than to serve as limits on the scope of what has been disclosed herein.

Also, it is to be understood that the phraseology and terminology used herein is for the purpose of description and should not be regarded as limiting. The use herein of "including," "comprising," "e.g.," "containing," or "having" and variations of those words is meant to encompass the items listed thereafter, and equivalents of those, as well as additional items.

What is claimed is:

1. A notification system for use with a filter clog detection system, the filter clog detection system being configured to monitor the condition of a filter in a gas conduit operatively attached to a gas blower, the gas blower having power to produce a first gas flow, comprising:
    a sensing system for measuring a property within the conduit, wherein a condition of the gas filter affects the value of the measured property;
    a processor configured to execute instructions for comparing a first value of the measured property when the gas filter is in a first state to a second value of the measured property when the gas filter is in a second state, and
    a networking module configured to transmit signals to a server, the signals representing information related to a condition of the filter based on comparing first and second values;
    wherein the networking module is configured to transmit signals automatically at predetermined intervals; and,
    wherein the sensing system comprises a first sensor and a second sensor, only one of which is connected to a heater, the sensors being configured to maintain a temperature difference between them, and wherein the measured property is a voltage reading for maintaining the temperature difference.

2. The notification system of claim 1, wherein the networking module is configured to respond to manual prompting by transmitting the signals to the server.

3. The notification system of claim 1, wherein the networking module is configured to communicate with a router for transmitting the signals from the sensing system to the server.

4. The notification system of claim 1, wherein the signals are transmitted according to binary values, one of which represents the existence of an alarm trigger while the other represents the absence of an alarm trigger.

5. The notification system of claim 1, wherein the sensing system is associated with a unique identifier.

6. The notification system of claim 1, further comprising a second processor configured to store the signals transmitted by the networking module.

7. The notification system of claim 6, wherein the second processor is configured to generate a message to a recipient associated with an alarm trigger.

8. The notification system of claim 7, wherein the message is any one of Clogged Filter, Low Battery, and Sensor Failure.

9. A method for providing notifications with a filter clog detection system, regarding the condition of a filter in a gas conduit operatively attached to a gas blower, the gas blower having power to produce a first gas flow, the sensing system being configured to measure a property within the conduit, wherein a condition of the gas filter affects the value of a measured property, the method comprising:
    configuring the sensing system for positioning in a location proximal to a gas filter:
    configuring a processor to compare a first value of the measured property when the gas filter is in a first state to a second value of the measured property when the gas filter is in a second state; and
    configuring a networking module to transmit signals representing information about a condition detected by the sensing system to a server, wherein the information is related to a condition of the filter or a condition of the sensing system,
    wherein the networking module is configured to transmit signals automatically at predetermined intervals; and
    wherein the measured property is a voltage reading for maintaining a temperature difference between a heated sensor and an unheated sensor positioned within the sensing system.

10. The method of claim 9, further comprising correlating changes in the voltage reading to differential pressure within the conduit.

11. The method of claim 9, further comprising configuring a login page accessible over the internet for any one or more of prompting input of a unique identifier for a particular sensing system, prompting input of content of a message associated with an alarm trigger, prompting identification of a mobile device for receiving Alert Messages by text message, and prompting input of an email address for receiving Alert Messages by email.

12. The method of claim 9, further comprising configuring a second processor to generate a message to a recipient upon the determination of an alarm trigger.

13. The method of claim 12, wherein the alarm trigger is associated with any one or more of clogged filter, low battery, and sensor failure.

14. A notification system for use with a filter clog detection system, the filter clog detection system being configured to monitor the condition of a filter in a gas conduit having an interior wall surface and being operatively attached to a gas blower, the gas blower being configured to produce a first gas flow, comprising:
    a sensing system for measuring a property within the conduit, wherein a condition of the gas filter affects the value of the measured property;
    a processor configured to execute instructions for comparing a first value of the measured property when the gas filter is in a first state to a second value of the measured property when the gas filter is in a second state, and
    a networking module configured to transmit signals to a server, the signals representing information related to a condition of the filter based on comparing first and second values;
    wherein the networking module is configured to transmit signals automatically at predetermined intervals; and,
    wherein the sensing system comprises a sensing tube having an inlet arranged to receive gas flow from outside the gas conduit, and an outlet in fluid communication with an interior of the gas conduit, wherein the processor correlates filter clogging with the lowering of temperature inside the sensing tube as gas from outside the gas conduit flows into and through the sensing tube.

15. The notification system of claim 14, wherein a portion of the sensing tube is positioned within the gas conduit and a portion of the sensing tube is positioned outside the gas conduit.

16. The notification system of claim 14, further comprising an outer plate configured for positioning between the sensing tube and the interior wall surface of the gas conduit.

17. The notification system of claim 14, wherein the networking module is configured to respond to manual prompting by transmitting the signals to the server.

18. The notification system of claim 14, wherein the networking module is configured to communicate with a router for transmitting the signals from the sensing system to the server.

19. The notification system of claim 14, wherein the sensing system is associated with a unique identifier.

* * * * *